US012769195B2

(12) United States Patent
Hsiao et al.

(10) Patent No.: US 12,769,195 B2
(45) Date of Patent: Oct. 20, 2026

(54) MULTI-FUNCTION PROJECTOR

(71) Applicant: HIMAX TECHNOLOGIES LIMITED, Tainan City (TW)

(72) Inventors: Ming-Shu Hsiao, Tainan City (TW); Meng-Ko Tsai, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 384 days.

(21) Appl. No.: 18/398,144

(22) Filed: Dec. 28, 2023

(65) Prior Publication Data

US 2025/0216758 A1 Jul. 3, 2025

(51) Int. Cl.
*G03B 21/20* (2006.01)
*B82Y 20/00* (2011.01)
*G03B 17/54* (2021.01)

(52) U.S. Cl.
CPC .......... *G03B 21/2033* (2013.01); *B82Y 20/00* (2013.01); *G03B 17/54* (2013.01); *G03B 21/208* (2013.01)

(58) Field of Classification Search
CPC .. G03B 21/2033; G03B 17/54; G03B 21/208; B82Y 20/00; G01B 11/2513; G01S 7/4815; G01S 17/894; G02B 1/002; G02B 27/425
USPC ............................................................ 353/31
See application file for complete search history.

(56) References Cited

U.S. PATENT DOCUMENTS

2018/0286063 A1 10/2018 Zhou et al.
2019/0064532 A1* 2/2019 Riley, Jr. ............ G02B 27/0916
2019/0137665 A1* 5/2019 You ........................ G01B 11/25
2019/0388194 A1* 12/2019 Atiya ................ A61B 1/00193
2021/0176403 A1 6/2021 Noble
2022/0252893 A1 8/2022 Hsiao
2022/0385042 A1 12/2022 Devlin et al.
2023/0019896 A1 1/2023 Gronenborn
2023/0280468 A1 9/2023 Zhu et al.
2023/0288193 A1* 9/2023 Hamid Muhammed .................... G03B 17/54

(Continued)

FOREIGN PATENT DOCUMENTS

EP 4318029 2/2024
WO 2023167888 9/2023

OTHER PUBLICATIONS

"Search Report of Europe Counterpart Application", issued on Apr. 14, 2025, p. 1-p. 9.

(Continued)

*Primary Examiner* — Magda Cruz
(74) *Attorney, Agent, or Firm* — JCIPRNET

(57) ABSTRACT

A multi-function projector includes a multi-wavelength laser source, a metasurface, and a light sensor. The multi-wavelength laser source is configured to emit a laser beam, wherein a wavelength of the laser beam is capable of being switched to a first wavelength or a second wavelength. The metasurface is disposed on a path of the laser beam and configured to diffract the laser beam onto a projected surface. The metasurface is configured to diffract the laser beam with the first wavelength to form a light pattern on the projected surface, and the metasurface is configured to diffract the laser beam with the second wavelength to form flood illumination on the projected surface. The light sensor is disposed beside the metasurface and configured to sense the projected surface.

20 Claims, 8 Drawing Sheets

(56) References Cited

U.S. PATENT DOCUMENTS

| | | | | |
|---|---|---|---|---|
| 2024/0045126 | A1* | 2/2024 | Channon | G02B 27/0944 |
| 2024/0393551 | A1 | 11/2024 | Della Pergola et al. | |

OTHER PUBLICATIONS

"Search Report of Europe Related Application, Application No. 24204401.4", issued on Mar. 14, 2025, p. 1-p. 8.

"Office Action of U.S. related Application, U.S. Appl. No. 18/398,169", issued on Jun. 11, 2026, p. 1-p. 11.

* cited by examiner

MULTI-FUNCTION PROJECTOR

BACKGROUND

Technical Field

The invention generally relates to an optical device and in particular, to a multi-function projector.

Description of Related Art

Along with the progress of optical technology, structured light sensing technology or time-of-flight (ToF) sensing technology have been created. Generally speaking, a camera can capture a plane image, but cannot obtain a distance, i.e. a depth, from the camera to an object to be photographed. However, structured light sensing technology or ToF sensing technology is capable of obtain depth data.

For a structured light sensor or a ToF sensor, a light pattern projected onto a detected object may be needed, and the light pattern may be a dot pattern or a line pattern. A conventional structured light sensor or a conventional ToF sensor may use a diffractive optical element (DOE) to form the dot pattern and the line pattern. However, the surface of a DOE has a plurality of orders with different height, and the DOE combined with a lens has a large thickness, which cause the structured light sensor or the ToF sensor to be thick. Moreover, light pattern formed by a conventional structured light sensor or a conventional ToF sensor cannot be switched to flood illumination.

SUMMARY

Accordingly, the invention is directed to a multi-function projector, which has a thinner structure, and can be switched to provide a light pattern or flood illumination.

An embodiment of the invention provides a multi-function projector including a multi-wavelength laser source, a metasurface, and a light sensor. The multi-wavelength laser source is configured to emit a laser beam, wherein a wavelength of the laser beam is capable of being switched to a first wavelength or a second wavelength. The metasurface is disposed on a path of the laser beam and configured to diffract the laser beam onto a projected surface. The metasurface is configured to diffract the laser beam with the first wavelength to form a light pattern on the projected surface, and the metasurface is configured to diffract the laser beam with the second wavelength to form flood illumination on the projected surface. The light sensor is disposed beside the metasurface and configured to sense the projected surface.

An embodiment of the invention provides a multi-function projector including a first laser source, a first metasurface, a second laser source, a second metasurface, and a light sensor. The first laser source is configured to emit a first laser beam. The first metasurface is disposed on a path of the first laser beam and configured to diffract the first laser beam to form a light pattern on the projected surface. The second laser source is configured to emit a second laser beam. The second metasurface is disposed on a path of the second laser beam and configured to diffract the second laser beam to form flood illumination on the projected surface. The light sensor is disposed beside the first metasurface and the second metasurface and configured to sense the projected surface.

In the multi-function projector according to the embodiment of the invention, a metasurface is disposed to form a light pattern or flood illumination on a projected surface.

Compared with a DOE combined with a lens having a thicker structure, the structure of the metasurface is thinner, so that the multi-function projector according to the embodiment of the invention can have a thinner structure. Besides, a multi-wavelength laser source plus a metasurface is adopted, or two laser sources plus two metasurfaces are adopted, so that the multi-function projector according to the embodiment of the invention can be switched to provide a light pattern or flood illumination.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
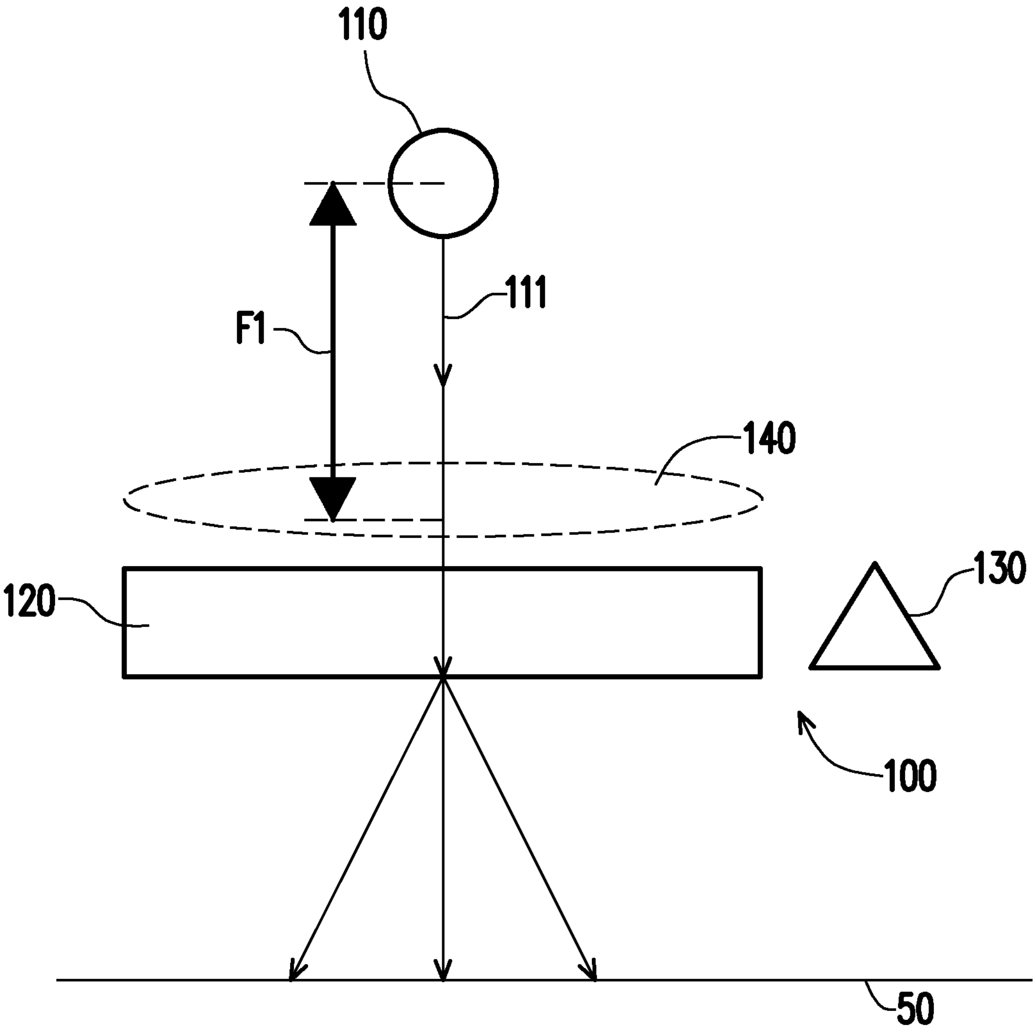
FIG. 1 is a schematic structural view of a multi-function projector according to an embodiment of the invention.
Figure 2:
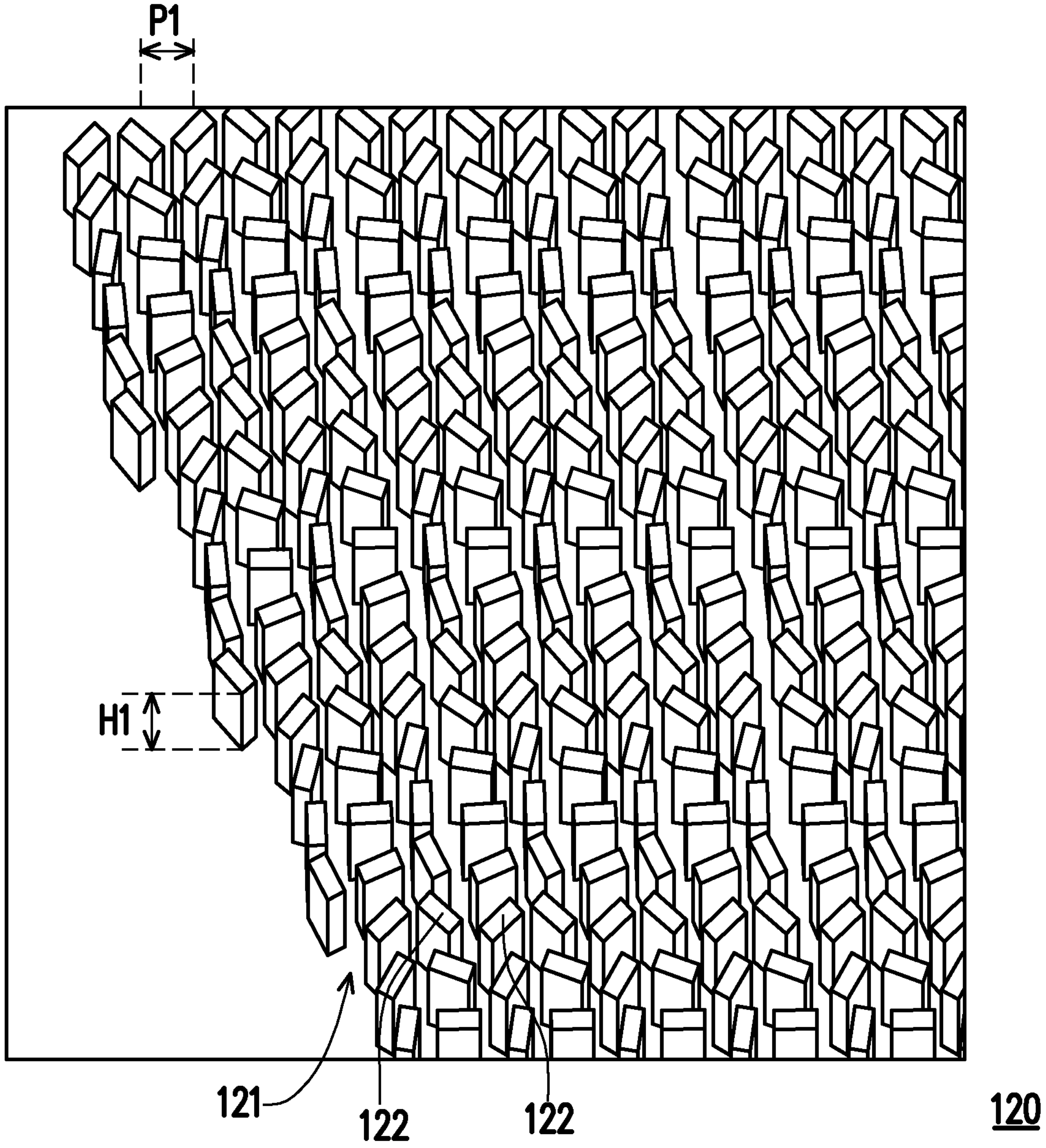
FIG. 2 is a perspective view of the metasurface in FIG. 1.
Figure 3A:
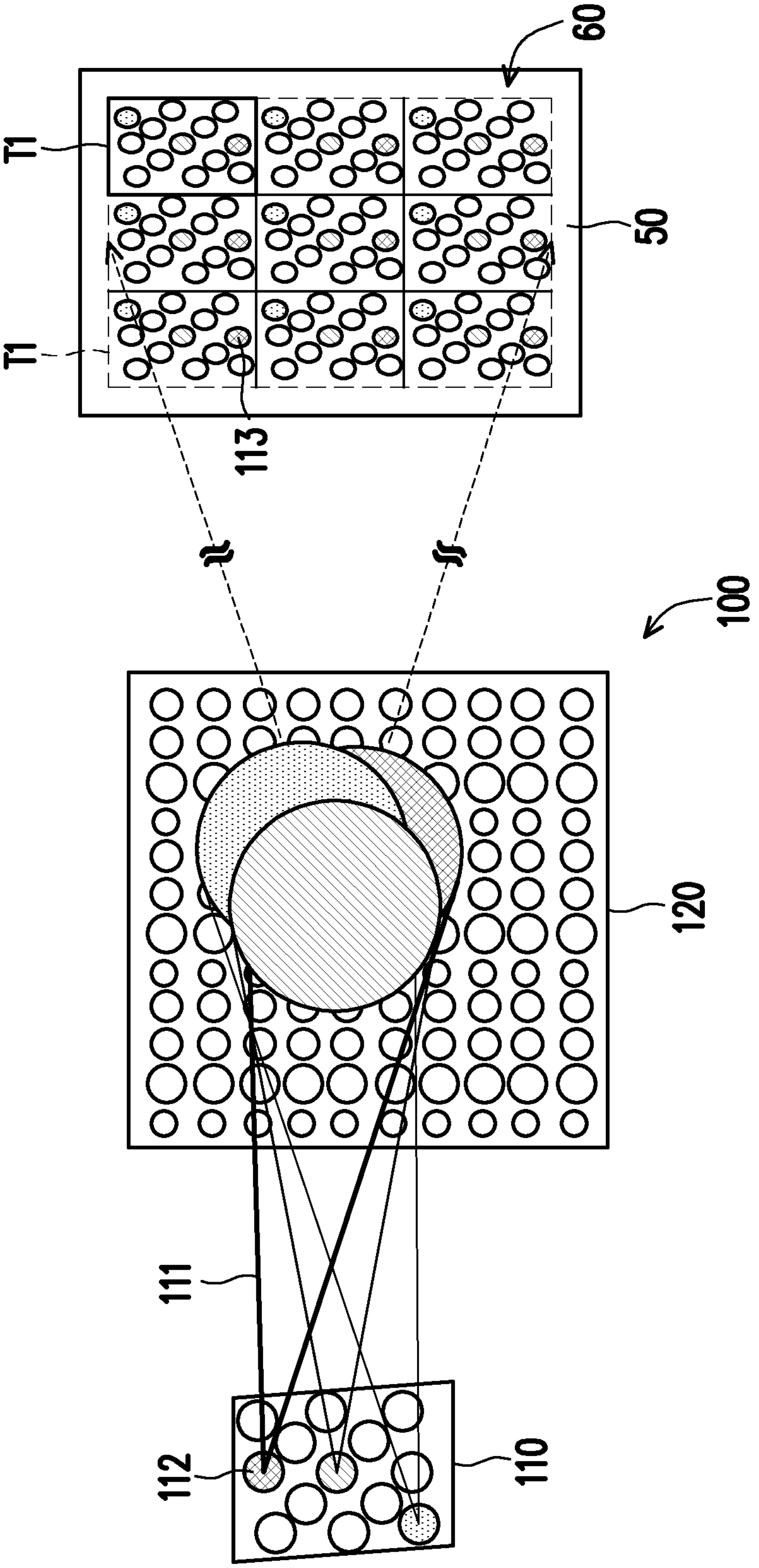
FIG. 3A shows front views of the multi-wavelength laser source and the metasurface in FIG. 1 and a front view of a light pattern projected by the multi-function projector on a projected surface when the wavelength of laser beam is switched to a first wavelength.
Figure 3B:
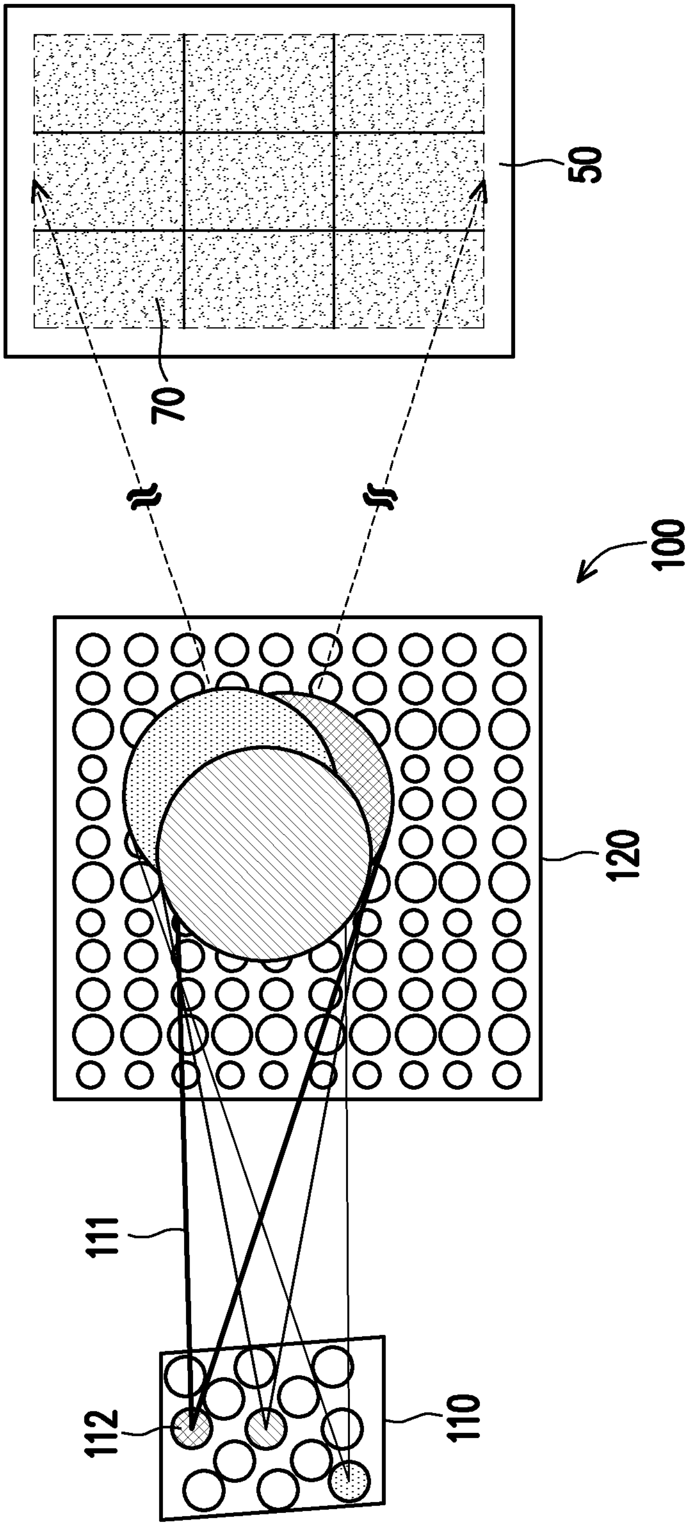
FIG. 3B shows front views of the multi-wavelength laser source and the metasurface in FIG. 1 and a front view of flood illumination projected by the multi-function projector on a projected surface when the wavelength of laser beam is switched to a second wavelength.

FIG. 1 is a schematic structural view of a multi-function projector according to an embodiment of the invention, FIG. 2 is a perspective view of the metasurface in FIG. 1, FIG. 3A shows front views of the multi-wavelength laser source and the metasurface in FIG. 1 and a front view of a light pattern projected by the multi-function projector on a projected surface when the wavelength of laser beam is switched to a first wavelength, and FIG. 3B shows front views of the multi-wavelength laser source and the metasurface in FIG. 1 and a front view of flood illumination projected by the multi-function projector on a projected surface when the wavelength of laser beam is switched to a second wavelength. Referring to FIG. 1, FIG. 2, FIG. 3A, and FIG. 3B, the multi-function projector 100 in this embodiment includes a multi-wavelength laser source 110, a metasurface 120, and a light sensor 130. The multi-wavelength laser source 110 is configured to emit a laser beam 111, wherein a wavelength of the laser beam is capable of being switched to a first wavelength or a second wavelength. In this embodiment, the multi-wavelength laser source 110 is a high contrast grating vertical-cavity surface-emitting laser (HCG VCSEL), which can emit a laser beam 111 with a plurality of wavelengths, e.g. the first wavelength and the second wavelength. In an embodiment, the first wavelength is 850 nanometer (nm), and the second wavelength is 940 nm, but the invention is not limited thereto. In this embodiment, the HCG VCSEL (i.e. the multi-wavelength laser source 110) has a plurality of point laser sources 112.

The metasurface 120 is disposed on a path of the laser beam 111 and configured to diffract the laser beam 111 onto a projected surface 50. The metasurface 120 is configured to diffract the laser beam 111 with the first wavelength to form a light pattern 60 on the projected surface 50 as shown in FIG. 3A, and the metasurface 120 is configured to diffract the laser beam 111 with the second wavelength to form flood illumination 70 on the projected surface 50, wherein flood illumination 70 means the illuminance of illumination within an area is uniform or approximately uniform. The light sensor 130 is disposed beside the metasurface 120 and configured to sense the projected surface 50.

In this embodiment, the metasurface 120 includes a plurality of nanopillars 122 standing up on and distributed over a surface 121 of a substrate to form a single layer of nanopillars 122. The surface 121 is, for example, a plane. In this embodiment, the nanopillars 122 are rectangular pillars. However, in other embodiments, the nanopillars 122 may be circular pillars, elliptic pillars, polygonal pillars, or pillars with any other shape. In this embodiment, orientations of the nanopillars 122 parallel to the surface 121 may be designed to be a certain orientation distribution, so that a required light pattern 60 may be formed by the nanopillars 122 diffracting the laser beam 111. Moreover, the pitch P1 of the nanopillars 122 may also be designed. For example, the nanopillars 122 may be designed to have several pitches, so that a required light pattern 60 may be formed by the nanopillars 122 diffracting the laser beam 111. In this embodiment, a height H1 of the nanopillars 122 (i.e. the height perpendicular to the surface 121) is less than 800 nanometers. Moreover, in this embodiment, the pitch P1 of the nanopillars 122 ranges from 300 nanometers to 800 nanometers.

In this embodiment, the multi-function projector 100 may further include a lens 140 disposed on a path of the laser beam 111 and between the multi-wavelength laser source 110 and the metasurface 120. In this embodiment, the multi-wavelength laser source 110 is disposed on the effective focal length (EFL) F1 of the lens 140 and the metasurface 120. However, in other embodiments, the multi-function projector 100 does not have the lens 140, and the multi-wavelength laser source 110 may be disposed on the EFL F1 of the metasurface 120.

In this embodiment, the light pattern 60 on the projected surface 50 includes a plurality of dots 113. That is to say, the light pattern 60 in this embodiment is a dot pattern. However, in other embodiment, the light pattern 60 may include a plurality of lines; that is, the light pattern 60 may be a line pattern. In this embodiment, the metasurface 120 is configured to diffract the laser beam 111 with the first wavelength to form a plurality of pattern tiles T1 arranged on the projected surface 50. In this embodiment, each of the pattern tiles T1 has a dot pattern corresponding to the pattern of the point laser sources 112 of the multi-wavelength laser source 110. Moreover, in this embodiment, the pattern tiles T1 are continuously distributed to form the whole of the light pattern 60.

In this embodiment, the multi-wavelength laser source 110, the metasurface 120, and the light sensor 130 may form a structured light sensor or a time-of-flight sensor. In the case of a structured light sensor, the light sensor 130 may be a camera configured to photograph the light pattern 60, and the metasurface 120 form a structured light. Besides, the projected surface 50 may be a plane, a curved surface, or a surface with any shape. For example, the projected surface 50 may be a human face.

In the multi-function projector 100 in this embodiment, a metasurface 120 is disposed to form a light pattern 60 or flood illumination 70 on a projected surface 50. In this embodiment, a height H1 of the nanopillars 122 is less than 800 nanometers. Compared with a DOE combined with a lens having a thicker structure, the structure of the metasurface 120 is thinner, so that the multi-function projector 100 in this embodiment may be thinner and have a thinner structure. Besides, a multi-wavelength laser source 110 plus a metasurface 120 is adopted, so that the multi-function projector 100 in this embodiment can be switched to provide a light pattern or flood illumination.

Figure 4:
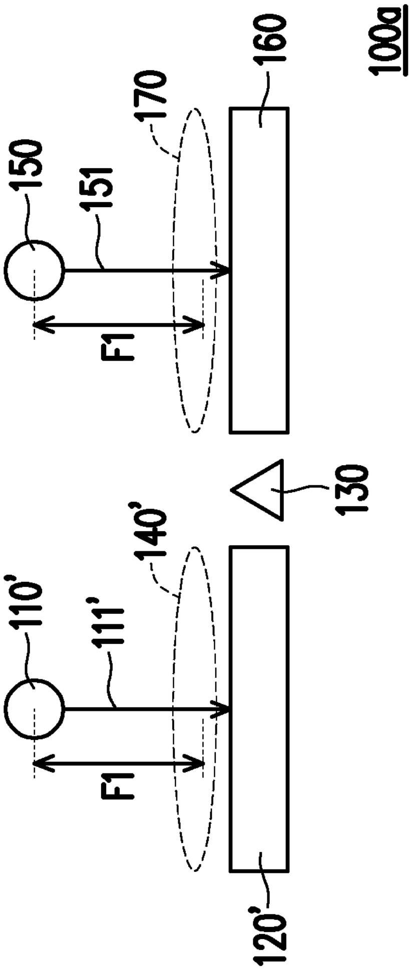
FIG. 4 is a schematic structural view of a multi-function projector according to another embodiment of the invention.
Figure 5:
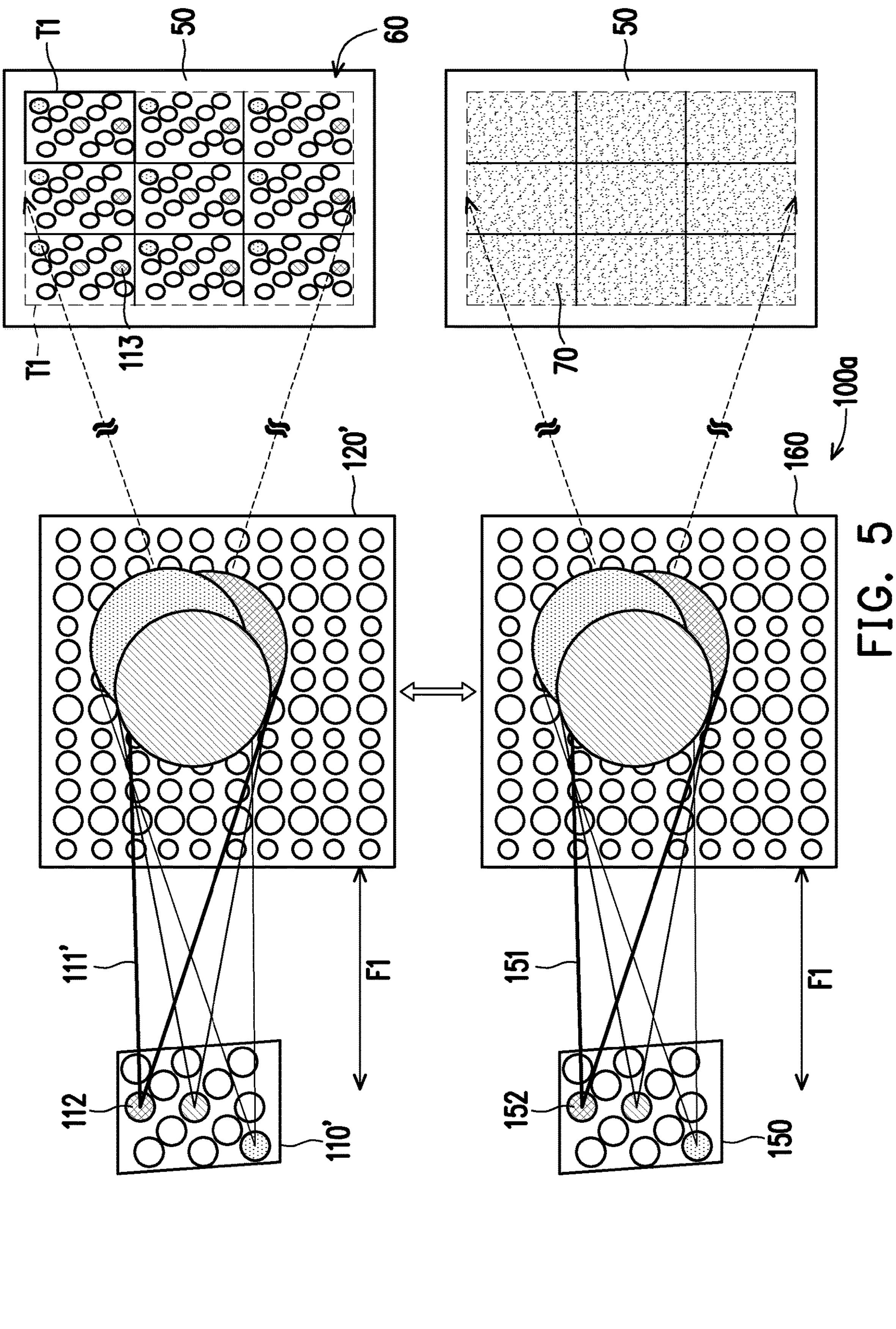
FIG. 5 shows front views of the first laser source, the second laser source, the first metasurface, and the second metasurface in FIG. 4 and front views of a light pattern and flood illumination projected by the multi-function projector on a projected surface.

FIG. 4 is a schematic structural view of a multi-function projector according to another embodiment of the invention, and FIG. 5 shows front views of the first laser source, the second laser source, the first metasurface, and the second metasurface in FIG. 4 and front views of a light pattern and flood illumination projected by the multi-function projector on a projected surface. Referring to FIG. 4 and FIG. 5, the multi-function projector 100*a* in this embodiment is similar to the multi-function projector 100 in FIG. 3, and the main difference therebetween is as follows. In this embodiment, the multi-function projector 100*a* including a first laser source 110', a first metasurface 120', a second laser source 150, a second metasurface 160, and a light sensor 130. The first laser source 110' is configured to emit a first laser beam 111'. The first metasurface 120' is disposed on a path of the first laser beam 111' and configured to diffract the first laser beam 111' to form a light pattern 60 on the projected surface 50. The second laser source 150 is configured to emit a second laser beam 151. The second metasurface 160 is disposed on a path of the second laser beam 151 and configured to diffract the second laser beam 151 to form flood illumination 70 on the projected surface 50. The light sensor 130 is disposed beside the first metasurface 120' and the second metasurface 160 and configured to sense the projected surface 50. In this embodiment, the light sensor 130 is disposed between the first metasurface 120' and the second metasurface 160. When the first laser source 110' is turned on and the second laser source 150 is turned off, a light pattern 60 is projected on the projected surface 50. When the first laser source 110' is turned off and the second laser source 150 is turned on, flood illumination 70 is projected on the projected surface 50. In this embodiment, two laser sources plus two metasurfaces are adopted, so that the multi-function projector 100*a* according to the embodiment of the invention can be switched to provide a light pattern or flood illumination.

In this embodiment, the first metasurface 120' is configured to diffract the first laser beam 111' to form a plurality of pattern tiles T1 arranged on the projected surface 50. In this embodiment, the light pattern 60 on the projected surface 50 includes a plurality of dots 113.

In this embodiment, the first laser source 110', the first metasurface 120', the second laser source 150, the second metasurface 160, and the light sensor 130 form a structured light sensor or a time-of-flight sensor. In this embodiment, the light sensor 130 is a camera.

In this embodiment, the first laser source 110' and the second laser source 150 are vertical-cavity surface-emitting lasers or photonic crystal surface-emitting lasers.

In this embodiment, the multi-function projector 100*a* further includes a first lens 140' and a second lens 170. The first lens 140' disposed on a path of the first laser beam 111' and between the first laser source 110' and the first metasurface 120'. The second lens 170 is disposed on a path of the second laser beam 151 and between the second laser source 150 and the second metasurface 160. In this embodiment, the first laser source 110' is at the focus corresponding to the effective focal length F1 of the first lens 140' and the first metasurface 120', and the second laser source 150 is at the focus corresponding to the effective focal length F1 of the second lens 170 and the second metasurface 160. However, in other embodiments, the multi-function projector 100*a* may not have the first lens 140' and the second lens 170, so that the first laser source 110' is at the focus corresponding to the effective focal length F1 of the first metasurface 120', and the second laser source 150 is at the focus corresponding to the effective focal length F1 of the second metasurface 160.

In this embodiment, each of the first metasurface 120' and the second metasurface 160 includes a plurality of nanopillars 122 standing up on and distributed over a surface 121, wherein the height H1 of the nanopillars 122 is less than 800 nanometers, and the pitch P1 of the nanopillars 122 ranges from 300 nanometers to 800 nanometers.

Figure 6:
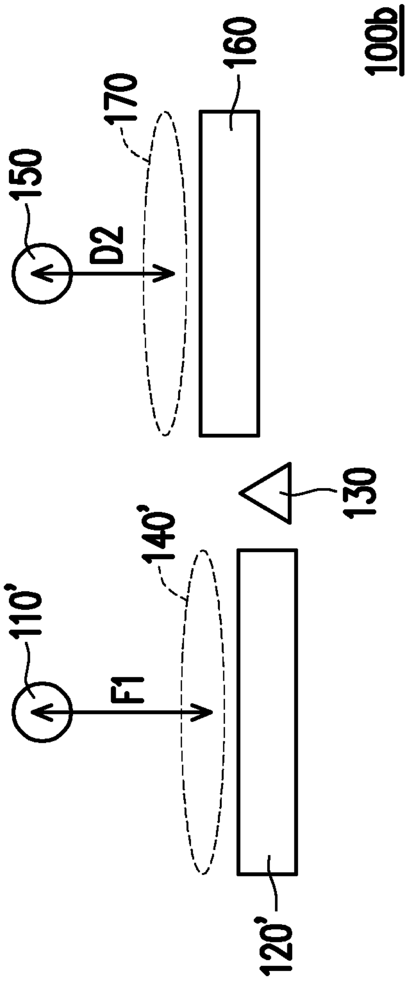
FIG. 6 is a schematic structural view of a multi-function projector according to another embodiment of the invention.
Figure 7:
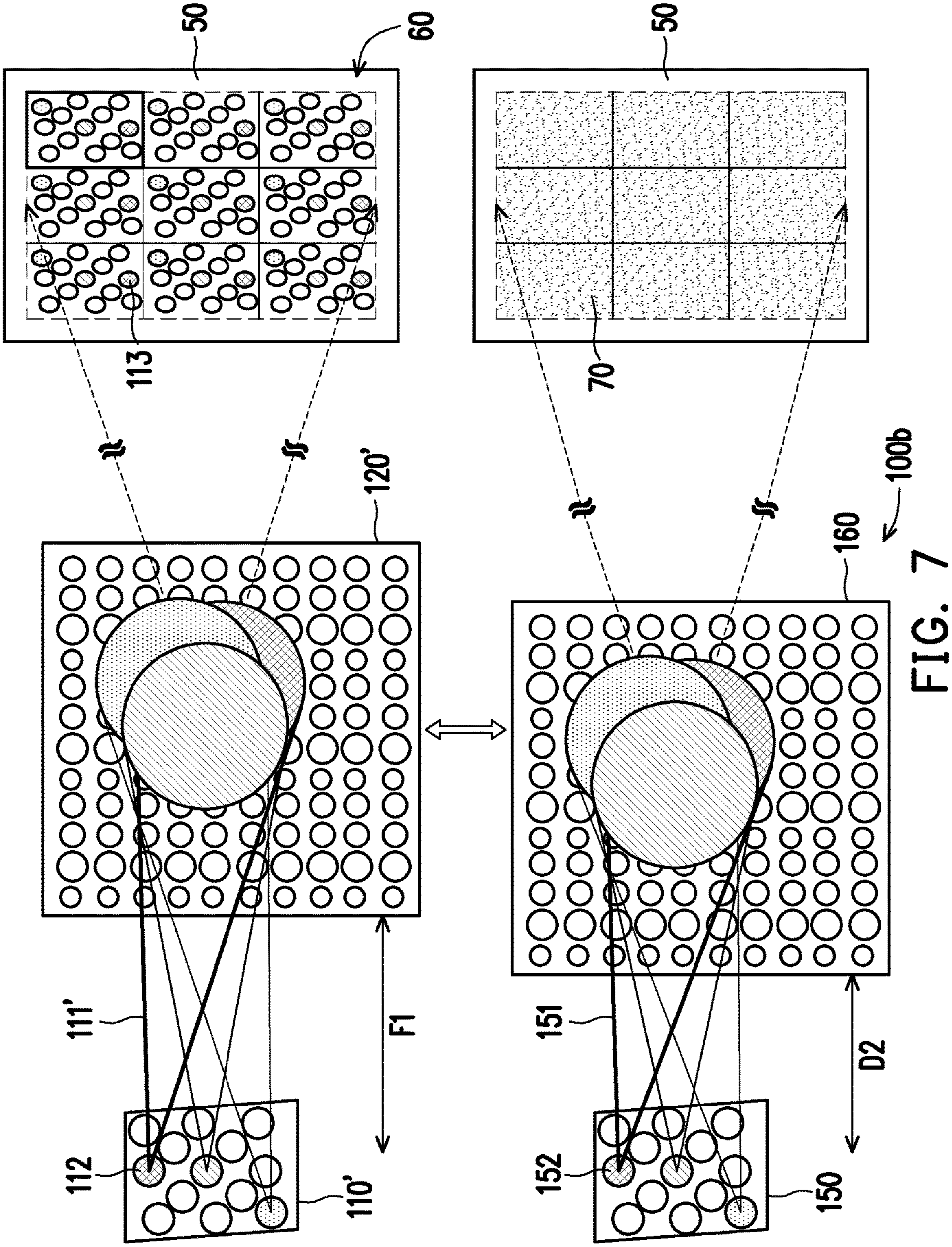
FIG. 7 shows front views of the first laser source, the second laser source, the first metasurface, and the second metasurface in FIG. 6 and front views of a light pattern and flood illumination projected by the multi-function projector on a projected surface.

FIG. 6 is a schematic structural view of a multi-function projector according to another embodiment of the invention, and FIG. 7 shows front views of the first laser source, the second laser source, the first metasurface, and the second metasurface in FIG. 6 and front views of a light pattern and flood illumination projected by the multi-function projector on a projected surface. Referring to FIG. 6 and FIG. 7, the multi-function projector 100*b* in this embodiment is similar to the multi-function projector 100*a* in FIG. 4, and the main difference therebetween is as follows. In this embodiment, the second laser source 150 is defocused with respect to the second metasurface 160. For example, the distance D2 between the optical center of the second lens 170 and the second metasurface 160 is not equal to the effective focal length F1 of the second lens 170 and the second metasurface 160. As a result, the design of the second metasurface 160 may be the same as the first metasurafce 120', and the second metasurface 160 can still form flood illumination because the second laser source 150 is defocused with respect to the second metasurface 160.

In the multi-function projector according to the embodiment of the invention, a metasurface is disposed to form a light pattern or flood illumination on a projected surface. Compared with a DOE combined with a lens having a thicker structure, the structure of the metasurface is thinner, so that the multi-function projector according to the embodiment of the invention can have a thinner structure. Besides, a multi-wavelength laser source plus a metasurface is adopted, or two laser sources plus two metasurfaces are adopted, so that the multi-function projector according to the embodiment of the invention can be switched to provide a light pattern or flood illumination.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A multi-function projector comprising:
- a multi-wavelength laser source configured to emit a laser beam, wherein a wavelength of the laser beam is capable of being switched to a first wavelength or a second wavelength;
- a metasurface disposed on a path of the laser beam and configured to diffract the laser beam onto a projected surface, wherein the metasurface is configured to diffract the laser beam with the first wavelength to form a light pattern on the projected surface, and the metasurface is configured to diffract the laser beam with the second wavelength to form flood illumination on the projected surface; and
- a light sensor disposed beside the metasurface and configured to sense the projected surface,
- wherein an area of the laser beam with the first wavelength emitting on the metasurface overlaps with an area of the laser beam with the second wavelength emitting on the metasurface.

2. The multi-function projector according to claim 1, wherein the metasurface is configured to diffract the laser beam with the first wavelength to form a plurality of pattern tiles arranged on the projected surface.

3. The multi-function projector according to claim 1, wherein the light pattern on the projected surface comprises a plurality of dots.

4. The multi-function projector according to claim 1, wherein the multi-wavelength laser source, the metasurface, and the light sensor form a structured light sensor or a time-of-flight sensor.

5. The multi-function projector according to claim 1, wherein the laser source is a high contrast grating vertical-cavity surface-emitting laser.

6. The multi-function projector according to claim 1, the light sensor is a camera.

7. The multi-function projector according to claim 1 further comprising a lens disposed on a path of the laser beam and between the multi-wavelength laser source and the metasurface.

8. The multi-function projector according to claim 1, wherein the metasurface comprises a plurality of nanopillars standing up on and distributed over a surface.

9. The multi-function projector according to claim 8, wherein a height of the nanopillars is less than 800 nanometers.

10. The multi-function projector according to claim 8, wherein a pitch of the nanopillars ranges from 300 nanometers to 800 nanometers.

11. A multi-function projector comprising:
- a first laser source configured to emit a first laser beam;
- a first metasurface disposed on a path of the first laser beam and configured to diffract the first laser beam to form a light pattern on the projected surface;
- a second laser source configured to emit a second laser beam;
- a second metasurface disposed on a path of the second laser beam and configured to diffract the second laser beam to form flood illumination on the projected surface;
- a light sensor disposed beside the first metasurface and the second metasurface and configured to sense the projected surface;

a first lens disposed on a path of the first laser beam and between the first laser source and the first metasurface; and a second lens disposed on a path of the second laser beam and between the second laser source and the second metasurface.

12. The multi-function projector according to claim 11, wherein the first metasurface is configured to diffract the first laser beam to form a plurality of pattern tiles arranged on the projected surface.

13. The multi-function projector according to claim 11, wherein the light pattern on the projected surface comprises a plurality of dots.

14. The multi-function projector according to claim 11, wherein the first laser source, the first metasurface, the second laser source, the second metasurface, and the light sensor form a structured light sensor or a time-of-flight sensor.

15. The multi-function projector according to claim 11, wherein the first laser source and the second laser source are vertical-cavity surface-emitting lasers or photonic crystal surface-emitting lasers.

16. The multi-function projector according to claim 11, the light sensor is a camera.

17. The multi-function projector according to claim 11, wherein each of the first metasurface and the second metasurface comprises a plurality of nanopillars standing up on and distributed over a surface.

18. The multi-function projector according to claim 17, wherein a height of the nanopillars is less than 800 nanometers.

19. The multi-function projector according to claim 17, wherein a pitch of the nanopillars ranges from 300 nanometers to 800 nanometers.

20. The multi-function projector according to claim 11, wherein the second laser source is defocused with respect to the second metasurface.

* * * * *